US008204903B2

(12) United States Patent
Bowers et al.

(10) Patent No.: US 8,204,903 B2
(45) Date of Patent: Jun. 19, 2012

(54) EXPRESSING AND EXECUTING SEMANTIC QUERIES WITHIN A RELATIONAL DATABASE

(75) Inventors: Stuart M. Bowers, Redmond, WA (US); Thomas E. Jackson, Redmond, WA (US); Chris Demetrios Karkanias, Sammamish, WA (US); Allen L. Brown, Bellevue, WA (US); David G. Campbell, Sammamish, WA (US); Brian S. Aust, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 12/705,983

(22) Filed: Feb. 16, 2010

(65) Prior Publication Data

US 2011/0202560 A1    Aug. 18, 2011

(51) Int. Cl.
*G06F 17/30* (2006.01)
(52) U.S. Cl. ......... 707/773; 707/713; 707/739; 707/798
(58) Field of Classification Search ............. 707/713, 707/718, 739, 769, 773
See application file for complete search history.

(56) References Cited

U.S. PATENT DOCUMENTS

| | | | | | |
|---|---|---|---|---|---|
| 5,724,570 | A | * | 3/1998 | Zeller et al. | 707/705 |
| 2006/0036592 | A1 | * | 2/2006 | Das et al. | 707/713 |
| 2006/0200438 | A1 | * | 9/2006 | Schloming | 707/705 |
| 2006/0218123 | A1 | | 9/2006 | Chowdhuri et al. | |
| 2006/0235823 | A1 | * | 10/2006 | Chong et al. | 707/705 |
| 2007/0022107 | A1 | * | 1/2007 | Yuan et al. | 707/713 |
| 2008/0183661 | A1 | | 7/2008 | Orlowska et al. | |
| 2008/0215542 | A1 | * | 9/2008 | Lim et al. | 707/769 |
| 2009/0094216 | A1 | * | 4/2009 | Hou et al. | 707/713 |

FOREIGN PATENT DOCUMENTS

WO    2006020343 A1    2/2006

OTHER PUBLICATIONS

Ghaemi, Houman, "Using SQL Server 2008 Reporting Services with the.NET Framework Data Provider for Teradata", Retrieved at <<http://msdn.microsoft.com//en-us/library/dd182005.aspx>>Oct. 2008, pp. 28.
Ranganathan, et al., "Information Retrieval from Relational Databases Using Semantic Queries" Retrieved at <<http://delivery.acm.org/10.1145/1190000/1183747/p820-ranganathan.pdf?key1=1183747&key2=3746693621&coll=GUIDE&dl=GUIDE&CFID=73842569&CFTOKEN=28052367>> In the proceedings of the 15th ACM international conference on Information and knowledge management , Nov. 5-11, 2006, pp. 820-821.
Zhou, et al., "A Semantic Mapping System for Bridging the Gap between Relational Database and Semantic Web", Retrieved at http://www.aaai.org/Papers/Symposia/Spring/2008/SS-08-05/SS08-05-025.pdf>> 2008, pp. 6.

(Continued)

*Primary Examiner* — Shahid Alam
*Assistant Examiner* — Andalib Lodhi
(74) *Attorney, Agent, or Firm* — Joseph R. Kelly; Westman, Champlin & Kelly, P.A.

(57) ABSTRACT

Semantic queries are expressed and executed within a relational database. This can be done by defining semantic rules applied to execute the semantic queries using table valued functions and common table expressions, and then simply calling the defined table valued functions to execute the queries.

18 Claims, 6 Drawing Sheets

OTHER PUBLICATIONS

Maier, et al., "Efficient Integration of PROLOG and Relational Databases in the NED Intelligent Information System", Retrieved at <<http://www.cs.uga.edu/~potter/dendrite/ike_submission.pdf>> Jan. 20, 2010, pp. 1-5.

Pan, et al., "DLDB: Extending Relational Databases to Support Semantic Web Queries" Retrieved at <<http://www.cse.lehigh.edu/~heflin/pubs/psss03-poster.pdf>> 2003, pp. 109-113.

Hert, Matthias, "Relational Databases as Semantic Web Endpoints", Retrieved at <<http://www.ifi.uzh.ch/pax/uploads/pdf/publication/1104/hert_eswc09a.pdf>> Jan. 20, 2010, pp. 5.

"International Search Report", Mailed Date: Sep. 29, 2011, Application No. PCT/US2011/023806, Filed Date: Feb. 4, 2011, pp. 8. (MS# 328672.02).

* cited by examiner

US 8,204,903 B2

EXPRESSING AND EXECUTING SEMANTIC QUERIES WITHIN A RELATIONAL DATABASE

BACKGROUND

Data can be stored in a way that represents relationships between factual entities in a graph. Data stored in this form is sometimes referred to as resource description framework data (or RDF data). RDF data is often referred to as a graph that includes a set of triples, wherein each triple includes a subject, a predicate, and an object. This type of triple can be thought of as a directed-arc diagram in which each triple is represented as a node-arc-node link. Each triple represents a statement of a relationship between the things denoted by the nodes in that link. The subject and object are represented by the nodes and the predicate is represented by the directed link. Links are sometimes referred to as edges. These edges or links are labeled and links with different labels have different meanings. The directionality of the link is also significant, in that it always points toward the object. Two exemplary items that can be represented by a graph of triples are:
"Maui is located in the Pacific Ocean"; and
"Maui is an island".
The triple representing the first fact includes "Maui" and "Pacific Ocean" as nodes and a link labeled "location" pointing from Maui to Pacific Ocean.

A rule is a system by which a new triple can be inferred based on existing triples. With reference to the examples given above, a rule might be "if some object is located in the Pacific Ocean and that object is an island, it can be inferred that the object is a "Pacific island".

Semantic reasoning systems allow a user to execute logical queries against a graph of triples in order to discover new information. For example, some semantic reasoning engines are implemented using the Prolog language, which is a general purpose logic programming language associated with artificial intelligence and computational linguistics, or the Datalog language, which is a query and rule language for deductive data stores that syntactically is a subset of Prolog. These two are only exemplary languages which may be implemented in a semantic reasoning engine, and others are used as well.

In systems where semantic queries (that is, queries that are dependent for their execution upon the execution of semantic reasoning or which require the calling and application of semantic rules) are executed, a semantic reasoning engine is often deployed between a user that provides a query, and a relational data store. The relational data store contains the facts and relationships either in the form of triples, as discussed above, or in a form from which such triples can be inferred. These types of systems use the semantic reasoning engine to encode and execute rules and provide a query language that can be used by a user to access data that is either stored in the form of triples or stored in a form from which the triples can be inferred.

However, such systems suffer from a number of drawbacks. The semantic reasoning engines are not easily extensible or scaleable. In addition, while parsing the input query and executing numerous queries against the relational data store, the semantic reasoning engines often materialize large datasets which take up a great deal of memory. Similarly, while the semantic reasoning engine is generating the desired results, it must perform its own memory and caching management.

The discussion above is merely provided for general background information and is not intended to be used as an aid in determining the scope of the claimed subject matter.

SUMMARY

In order to address at least some of these concerns, semantic queries are expressed and executed, using semantic rules, directly within a relational database. This eliminates or reduces the need for a dedicated semantic reasoning engine. Semantic rules can be expressed in terms of table valued functions, and recursive semantic rules can be expressed by defining a table valued function using a common table expression.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
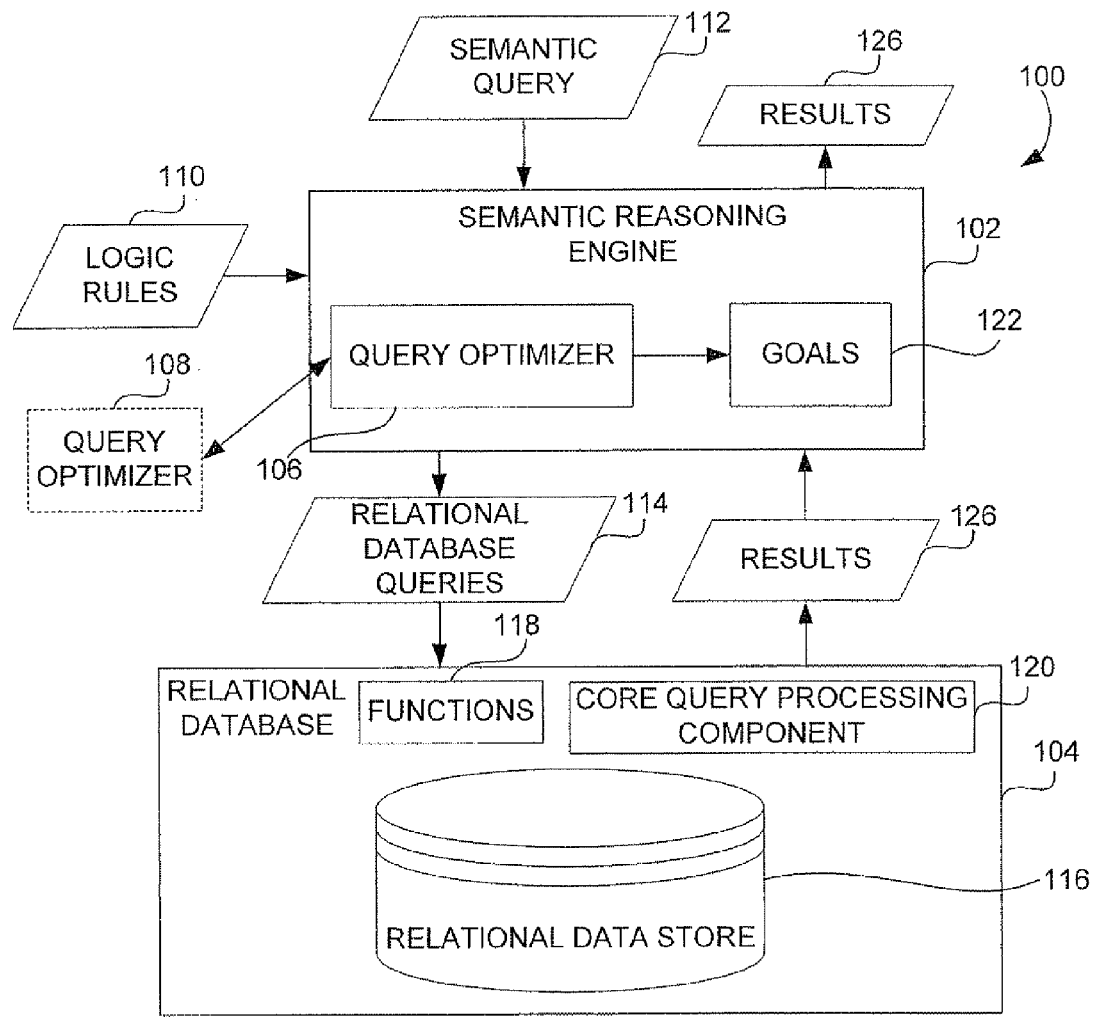
FIG. 1 is a block diagram of a system currently used to execute semantic queries against a relational database.

Prior to discussing the present invention in more detail it is helpful to consider the overall operation of a system that can, in one exemplary embodiment, be used to execute semantic queries against a relational database. FIG. 1 is a block diagram of a system 100 that can be used to execute semantic queries against data in a relational database. System 100 includes semantic reasoning engine 102, and relational database 104. Semantic reasoning engine 102 has access to a query optimizer 106 that is either located within semantic reasoning engine 102, or external to semantic reasoning engine 102 (as indicated by number 108). Semantic reasoning engine 102 utilizes logic rules 110 for converting a semantic query 112 into a set of relational database queries 114 that are executed against relational database 104. FIG. 1 also shows that relational database 104 includes relational data store 116, that itself includes the facts and relationships between them, often stored in tables, as well as functions 118 and core query processing component 120 that is used to actually execute the query against the relational data store 116.

In operation, semantic reasoning engine 102 first receives a semantic query 112 from a user. Semantic reasoning engine 102 loads logic rules 110 that it uses for performing semantic reasoning. Rules 110 are often first order logic rules such as those used in the Prolog programming language. Once engine 102 is finished loading rules 110, semantic query 112 is optimized to allow it to be more efficiently executed against the relational database 104. Basically, the optimization includes breaking the query into multiple blocks to isolate sections of the query that require semantic reasoning. In doing this, semantic reasoning engine 102 translates the query into an abstract syntax tree and strips out syntactic information that is not required. The syntax tree is converted to a language integrated query link syntax tree and passed to query optimizer 106 (or 108). The query optimizer 106 (or 108) identifies sections within the semantic query as being fully grounded and requiring no semantic reasoning. These sections undergo a sequence of re-write operations to become direct relational database queries 114. Once the queries have been transformed in this way, they are loaded into semantic reasoning engine 102 as goals 122. Through a series of relational database queries 114 executed against relational database 104, semantic reasoning engine 102 attempts to find results 126 that can then be returned to the user that submitted the semantic query 112.

It can be seen from system 100 that semantic reasoning engine 102 executes a significant volume of activity, with respect to memory usage and processing overhead, and it can easily be seen that semantic reasoning engine 102 may be required to make a large number of round trip queries to relational database 104, for even a fairly simple semantic query. In addition, some current semantic reasoning engines 102 use memoization techniques that cause it to retain deep copies of all temporary results, potentially starving the core query processing component 120 in relational database 104 of available memory.

Figure 2:
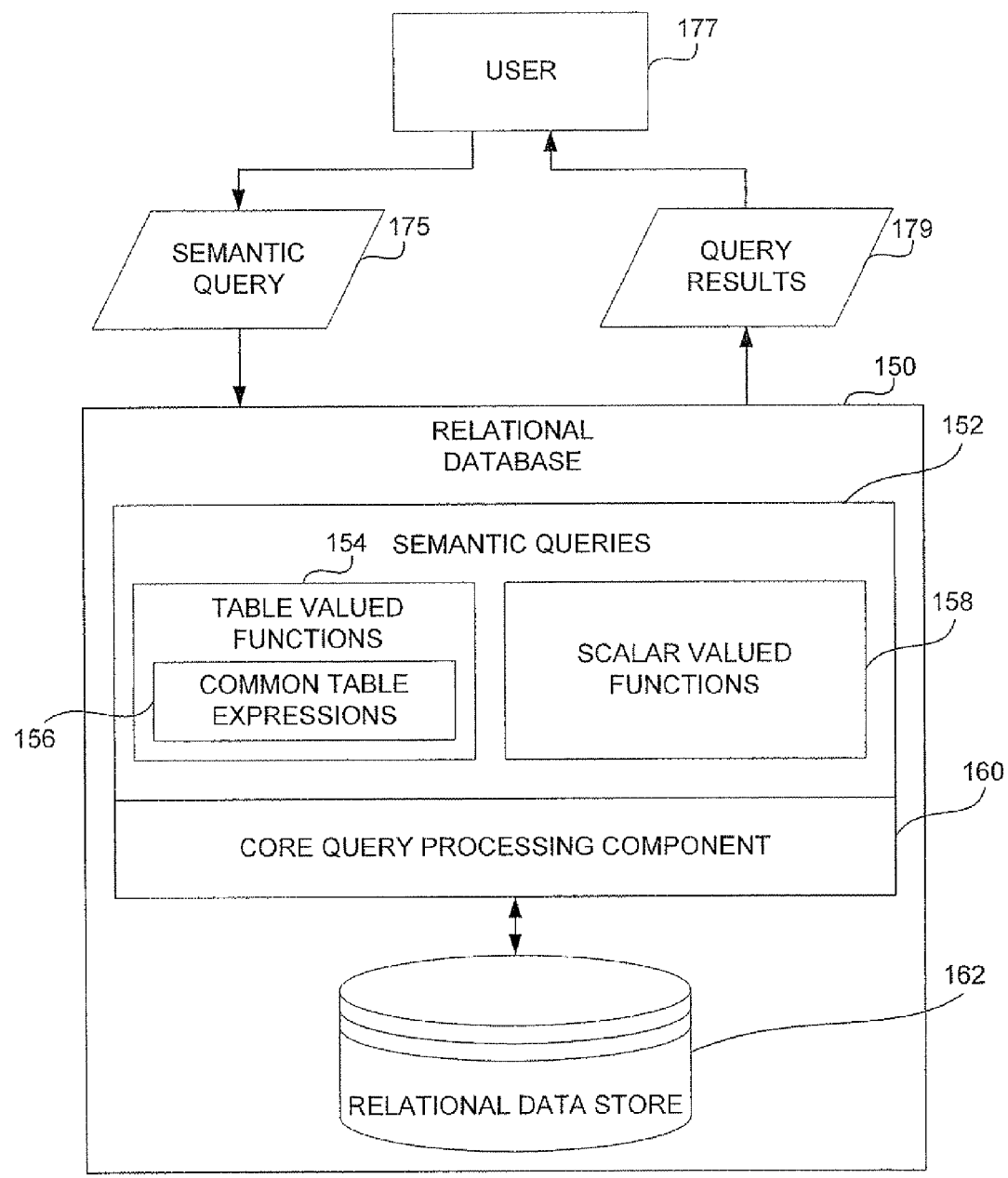
FIG. 2 is a block diagram of one embodiment of a relational database that expresses and executes semantic queries.

FIG. 2 is a block diagram of one illustrative embodiment of a relational database 150 that expresses and executes semantic queries 152 internally, using the technology already available in relational database 150, without requiring (or at least reducing the activity performed by) a dedicated semantic reasoning engine (such as engine 102 shown in FIG. 1). FIG. 2 shows that semantic queries 152 can be defined using table valued functions 154 (which may include common table expressions 156), as well as scalar valued functions 158. The semantic queries 152 are built on top of the core query processing component 160, which actually executes the queries against relational data store 162.

Figure 3:
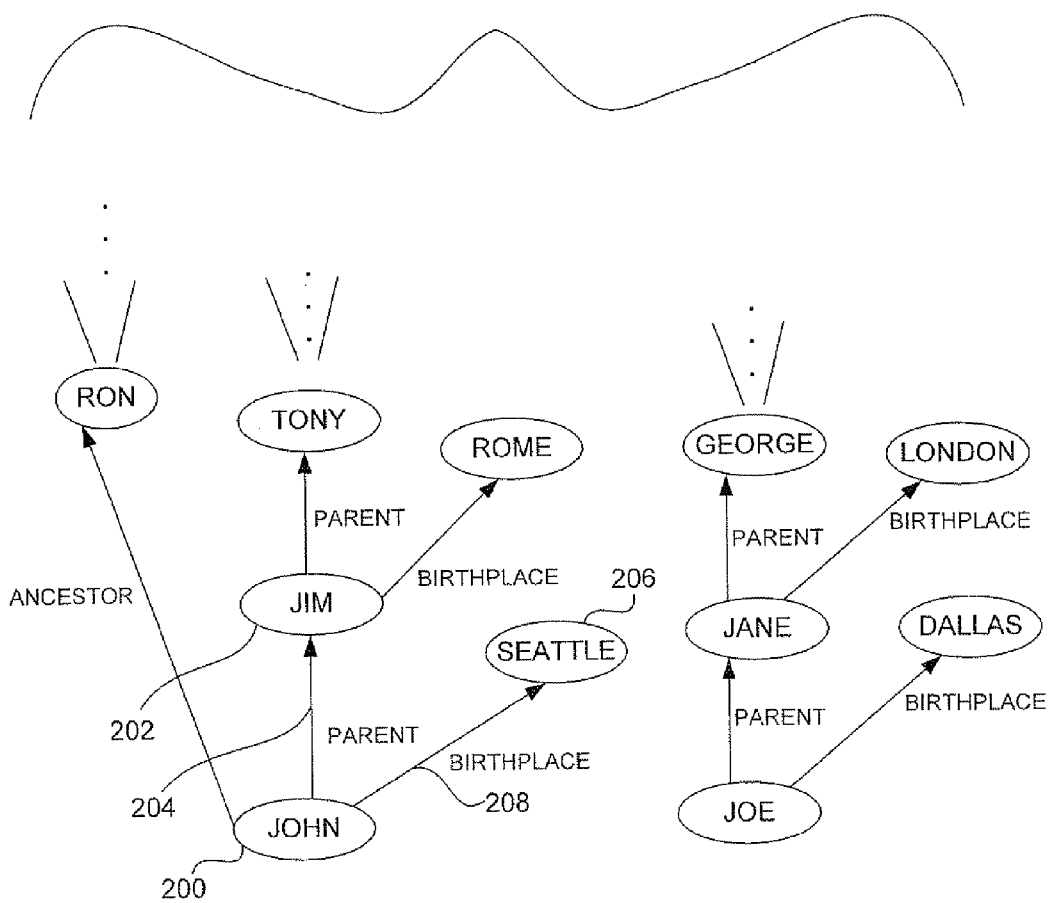
FIG. 3 is a simplified illustration of a graph structure in the form sets of triples.

Before discussing the operation of relational database 150 in more detail, one exemplary representation of data triples that include a subject, predicate and object is shown in FIG. 3. Of course, other structures could be used as well. FIG. 3 shows triples that illustrate the ancestral relationships and ancestral birthplaces of individuals contained therein. FIG. 3 shows that one triple, for instance, is formed of the nodes John 200 and Jim 202 connected by the relationship parent link 204. In that triple, John is the subject node 200 and Jim is the object node 202, while the relationship parent link 204 is the predicate. FIG. 3 also shows that the node John 200 is included in a birthplace triple wherein the John node 200 is the subject, Seattle node 206 is the object, and birthplace link 208 is the predicate.

If a client desires to obtain information from the data structure in FIG. 3, the client will submit a query for that information. If, in executing the query, a semantic rule must be called, then the query is a semantic query.

In order to execute a semantic query against the data structure illustrated in FIG. 3, relational database 150 will be discussed with respect to an example of both a recursive semantic rule and a non-recursive semantic rule Implementing semantic transitivity is also described. Transitivity, in one type of semantic programming language, can be defined as follows:

Rule 1:Ancestor (A,C):-Parent(A,B), Ancestor (B,C)
Rule 2: Ancestor (A,B):-Parent (A,B)

The left side of each rule is the name of the rule (or the head) and the right side is how the rule is fulfilled (or the body). Intuitively, Rule 2 means that a person A has the ancestor B if it is known that the person A has a parent B. In other words, if B is the parent of A, then B is also an ancestor of A. Therefore, wherever a parent relationship exists, an ancestor relationship also exists.

Intuitively, Rule 1 can be understood to mean that the person A has an ancestor C if it is known that A has a parent B and B has an ancestor C.

It can be seen that in Rule 1, the function "Ancestor" is mentioned on both sides of the rule (in both the head and the body). Therefore, Rule 1 is a recursive rule, while Rule 2 is a base rule or non-recursive rule. With this understanding, it should be noted that a semantic query that references a predicate may be a non-recursive query or a recursive query. For instance, if the predicate referenced by the semantic query requires calling a recursive rule (or is backed by a recursive rule) such as Rule 1, then the semantic query may properly be called a recursive semantic query, because it is backed by a recursive rule.

In some systems, queries requiring applications of these types of rules (Rules 1 and 2) are implemented by a dedicated semantic reasoning engine. Such a system is described above with respect to engine 102 shown in FIG. 1.

However, in order to obtain the increased performance of using the relational database technology, semantic queries can be directly expressed and executed as semantic queries 152 (in FIG. 2) entirely within relational database 150, using semantic rules, such as Rules 1 and 2. In one embodiment, the rules are represented by creating a table valued function with the following definition:

TABLE 1

```
CREATE FUNCTION
    [Ancestor@Sub](@Sub nvarchar(11))
    RETURNS TABLE AS RETURN
WITH
[Edges]([Sub], [Obj]) AS (
    SELECT [Sub], [Obj]
        FROM [Parent]( )
),
[Paths]([Sub], [Obj], [Length]) AS (
    SELECT [Edge].[Sub],
        [Edge].[Obj],
        1
    FROM [Edges] AS [Edge]
    WHERE [Edge].[Sub] = @Sub
    UNION ALL
    SELECT [Path].[Sub],
        [Edge].[Obj],
        [Length] + 1
    FROM [Paths] AS [Path]
    JOIN [Edges] AS [Edge]
        ON [Path].[Obj] = [Edge].[Sub]
    WHERE [Length] < 100
)
SELECT [Sub] as [Sub],
    [Obj] as [Obj]
FROM [Paths]
```

The first two lines of the code in Table 1 simply name the function Ancestor@Sub and indicate that a subject will be provided to the function. The next section of the code defines the edges and paths in the tree of triples (such as that shown in FIG. 3) that are going to be examined and returned from the function.

Assume, for the sake of example, that the user wishes to have the function of Table 1 return a list of ancestors for a subject "John". Then, the subject "John" will be input when the function is called, and the function will climb the graph structure (such as that shown on the left side of FIG. 3) to identify all ancestors of "John". It can be seen from Table 1 that the table valued function 154 uses a common table expression 156. Common table expressions afford a mechanism by which temporary tabling can be done by a server within the relational database 150 itself. This allows a set of bindings to exist within the relational database 150, without requiring the materialization of the bindings as objects in the memory of a process that is running within an external reasoning engine, such as engine 102. Using common table expressions 156 in this way can help to avoid roundtrip processing steps between the external semantic reasoning engine 102 and the relational database 150 for recursive functions. Similarly, it should be noted that the ability of a common table expression to temporarily materialize data need not be used in a system in which all rules are stored on a server instance for relational database 150, instead of being appended to a query.

There are a number of items of interest in the table valued function 154 (which uses a common table expression 156) in Table 1. First, it can be seen in line 20 of Table 1 that the common table expression 156 set out therein will climb up the tree structure or graph structure shown in FIG. 3. This is because line 20 restricts the function so that whatever is the object of the path (which is the current path that has just been discovered while climbing up the tree) is the subject of the edge (which is the new edge that is to be discovered next). Similarly, line 13 of the table valued function 154 in Table 1 requires that the subject input by the user is the same as that found on the bottom of the graph from which the climbing operation starts. That is, the subject of the function is bound to the value "John" and the function is simply trying to bind the object. This means that the function will climb from subject to object, upwards, across a string of predicates, in the structure shown in FIG. 3.

As the function climbs, for example, from the John node 200 to the Jim node 202 across predicate 204, newly discovered edges are added to the path, and the next edge is examined. In each iteration, the object of the current path is linked upward to the subject of a new edge.

It should also be noted that in line 7 of Table 1 the call for a new edge is actually a call to a table valued function.

Once the table value function is defined then the function simply performs the same logical operations as shown in Rules 1 and 2. This is illustrated in the "Select" and "From" portions in the last three lines of Table 1.

It can be seen that Table 1 defines the form of the "Ancestor" table valued function 154 where the subject is bound at the time the rule is to be executed. For all bindings to be implemented, four separate table valued functions 154 are used. Those values correspond to only the subject being bound, as in Table 1; only the object being bound; both the subject and the object being bound; and both the subject and object being unbound.

Another example may be helpful. Table valued functions 154 can be used, as discussed above, to also encode non-recursive rules. One semantic rule that looks for the birthplace of all ancestors is written as follows:

Rule 3: AncestralBirthplace (Person,Place):-Ancestor(Person,Anc), Birthplace (Anc,Place)

The rule of FIG. 3 can be intuitively understood to mean that a given person has an ancestral birthplace of "Place" if it is known that the given person has an ancestor of "Anc" and the ancestor "Anc" has a birthplace of "Place". It can be seen that, since the left and right side of Rule 3 do not share the same function, Rule 3 is a non-recursive rule. Rule 3 can be represented as a table valued function 154 within semantic queries 152 of FIG. 2, as follows:

TABLE 2

```
CREATE FUNCTION
    [AncestralBirthplace@Sub](@Sub nvarchar(11))
RETURNS TABLE AS RETURN
SELECT t0.Sub as [Sub],
    t1.Obj as [Obj]
  FROM
    [Ancestor@Sub] (@Sub) as t0
    CROSS APPLY [Birthplace@Sub](t0.Obj) as t1
```

As with the function defined in Table 1, the first two lines of the function defined in Table 2 name the function and indicate that the function will be given the subject of a relationship. The next four lines indicate that the edges will have subjects and objects, and the "FROM" clause calls the "Ancestor" function defined by Table 1 and provides, along with it, the subject input to the AncestralBirthplace function defined in Table 2.

The CROSS APPLY operator, in one embodiment, can be used to specify that the results of one table valued function are to serve as the input to another. Therefore, the CROSS APPLY function shown in Table 2 indicates that the outputs of the Ancestor function serve as the inputs to a Birthplace function which, in the embodiment shown in Table 2, is simply a table of birthplaces wrapped in a table valued function. The function simply identifies where an individual is born. Again, it should be noted that the subject of the "Birthplace" function is not the subject that was passed in to the AncestralBirthplace function defined in Table 2, but is instead the object of the "Ancestor" function called in the "FROM" clause. Edges that identify the birthplaces are identified as t1. In order to query the function defined in Table 2, the following can be used:

TABLE 3

```
SELECT t0.Obj
FROM
    [AncestralBirthplace@Sub]('Joe Smith') as t0
```

This query returns all valid binds for "place" provided that the subject can be bound to the value "Joe Smith".

It should be noted that the relational database 150 of FIG. 2 can operate in a number of different modes. For instance, relational database 150 can wait to receive a semantic query 175 from a user 177 and, at query time, build the necessary semantic rules in semantic queries 152, using either table valued functions 154 (along with common table expressions 156) or scalar valued functions 158. The semantic queries 152 can then be executed by core query processing component 160 against the relational data store 162 by calling the semantic rules just built. Alternatively, the semantic rules supporting semantic queries 152 can be written, and stored, ahead of time, and then simply referenced for execution of semantic query 175. Additionally, relational database 150 can operate in a combination of those two nodes, in which some queries are predefined and stored for later use at query time, and in which other queries are defined, represented, and executed as semantic queries 152, at query time. In any case, relational database 150 returns the query results 179 to user 177.

Figure 4:
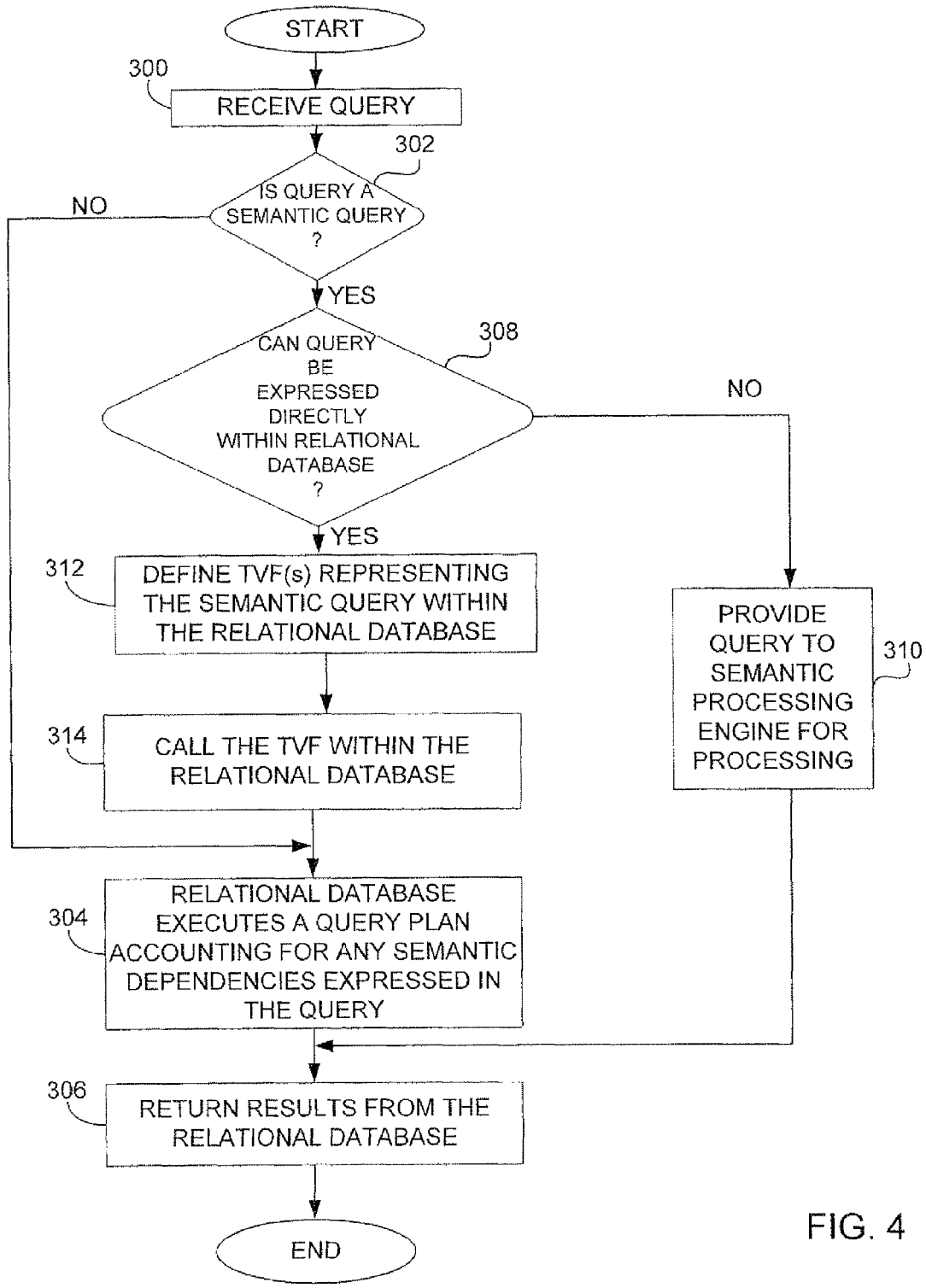
FIG. 4 is a flow diagram illustrating one embodiment of the overall operation of the system shown in FIG. 3.

FIG. 4 is a flow diagram illustrating a mode of operation of relational database 150 when the expressions (the semantic rules) for the semantic queries 152 are generated at query time. In that mode, relational database 150 first receives a query 175, and this is indicated by block 300. Relational database 150 then determines whether the query 175 is a semantic query, requiring semantic query definition. This can be done using a database sever (not shown) within database 150, using core query processing component 160, or another component within database 150. This is indicated by block 302. If not, the query is simply passed to the core query processing component 160, which executes a query plan to return results for the query, as indicated by blocks 304 and 306 in FIG. 4.

However, if, at block 302, it is determined that the query 175 is a semantic query (requiring calling of a semantic rule), then relational database 150 determines whether the query can be expressed directly within relational database 150, as indicated by block 308. In one embodiment, all semantic queries can be expressed and executed within relational database 150. These can include all classes of semantic queries (for instance, non-recursive queries that require calling of non-recursive semantic rules, linear recursive queries that require calling of linear recursive rules or require calling rules in a linear recursive way and bifurcating recursive queries that require calling of bifurcating recursive rules). It should also be noted, again, that a semantic query that references a predicate that requires execution of a recursive rule can, itself, be called a recursive query. In another embodiment, however, only a subset of classes of the semantic queries are expressed and executed within relational database 150. For instance, it may be beneficial, in one embodiment, to only provide for the expression and execution of non-recursive queries and linear recursive queries.

Even expressing and executing this subset of semantic queries directly within relational database 150 provides a significant increase in performance. In that embodiment, if a bifurcating recursive query is received, then it can be processed using an external or dedicated semantic reasoning engine as discussed above with respect semantic reasoning engine 102 in FIG. 1. Therefore, at block 308, relational database 150 determines whether the query 175 can be expressed directly within the relational database 150. If not, the query 175 is provided to a semantic processing engine for processing, as indicated by block 310.

However, if, at block 308, it is determined that the query can be expressed and executed directly within relational database 150, then relational database 150 defines a table valued function 154, representing the semantic query 175, within the relational database 150. Again, this can be performed by a server within relational database 150, by core query processing component 160, or otherwise. The table valued function 154 may include a common table expression 156 and will be a semantic rule in semantic query expression 152 that represents semantic query 175. Defining the table valued function 154 in this way is indicated by block 312 in FIG. 4.

Once the semantic query is expressed (such as using a table valued function 154 to define a semantic rule) directly within relational database 150, that table valued function 154 is then called within relational database 150. This is indicated by block 314 in FIG. 4. Core query processing component 160 executes the called table valued function 154 against the relational data store 162 using a query plan that accounts for any semantic dependencies expressed in the query. This is indicated by block 304. The query results 179 are returned to the user 177 for use in one of a variety of different consuming contexts in which the user 177 resides.

Figure 5:
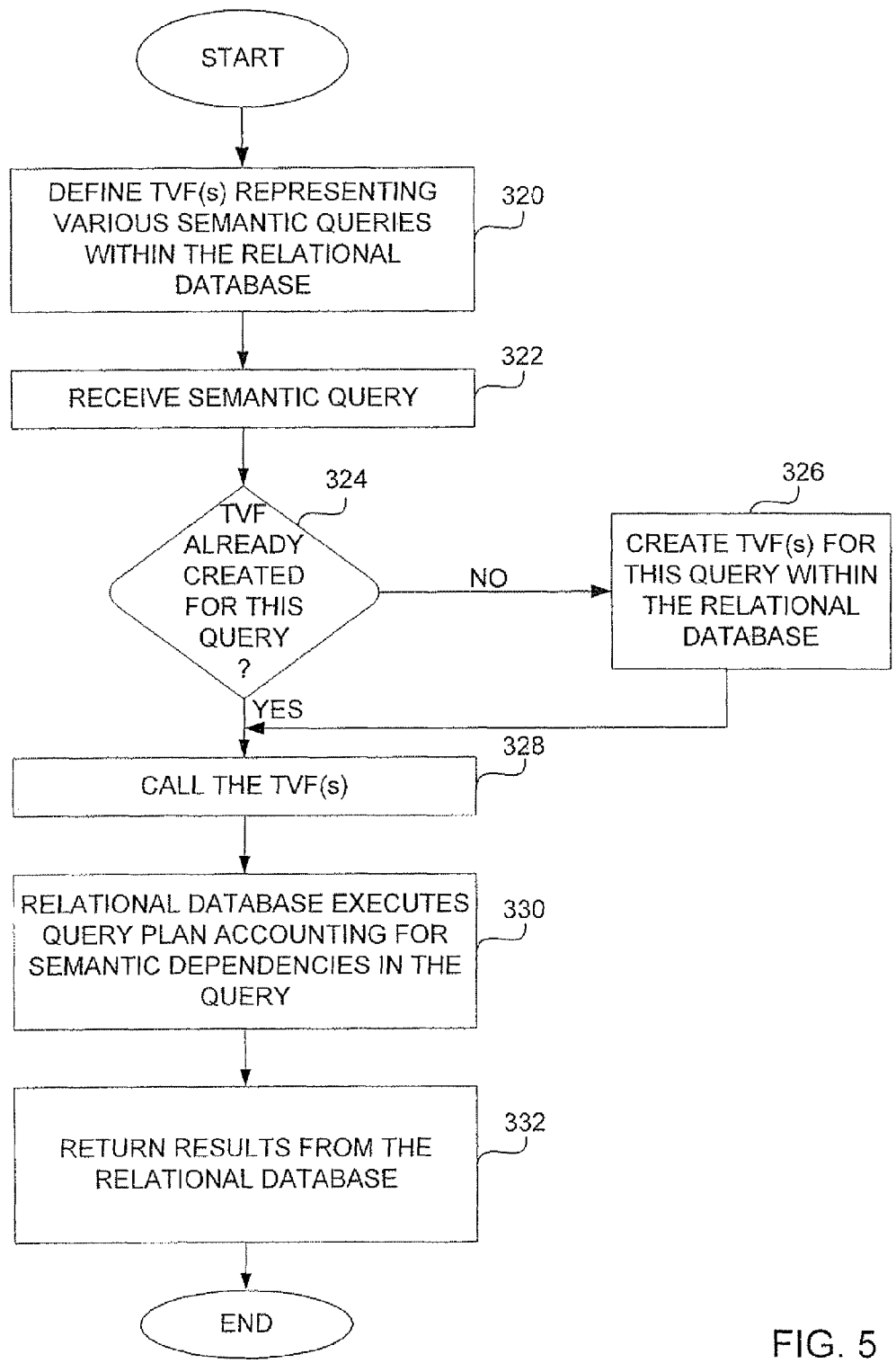
FIG. 5 is a flow diagram illustrating another embodiment of the operation of the system shown in FIG. 3.

FIG. 5 is a flow diagram illustrating the operation of the relational database 150 shown in FIG. 2 in another mode, in which at least some of the semantic queries 152 are already expressed and stored within relational database 150, prior to query time. In that embodiment, at some point prior to receiving a query, relational database 150 defines semantic rule as table valued functions representing various semantic queries 152 within relational database 150. Those query expressions are stored as semantic queries 152 within relational database 150 for later use. This is indicated by block 320 in FIG. 5.

Then, at query time, relational database 150 receives semantic query 175. This is indicated by block 322.

Relational database 150 then determines whether semantic rules in a semantic query 152 already exist, which express the semantic query 175. This is indicated by block 324 in FIG. 5 and can be done by a server within relational database 150, by core query processing component 160, or using another component. If not, then a table valued function 154 or other function is created for the newly received query, within the relational database 150. This is indicated by block 326.

If the semantic query 152 has already been created and stored, prior to query time, or after it is created at query time, then core query processing component 160 calls the semantic rule representing the query and executes a query plan accounting for the semantic dependencies in the query. This is indicated by blocks 328 and 330 in FIG. 2. Relational database 150 then returns the query results 179, to the user. This is indicated by block 332 in FIG. 5. By expressing and executing semantic queries directly within relational database 150, performance increases can be realized.

Figure 6:
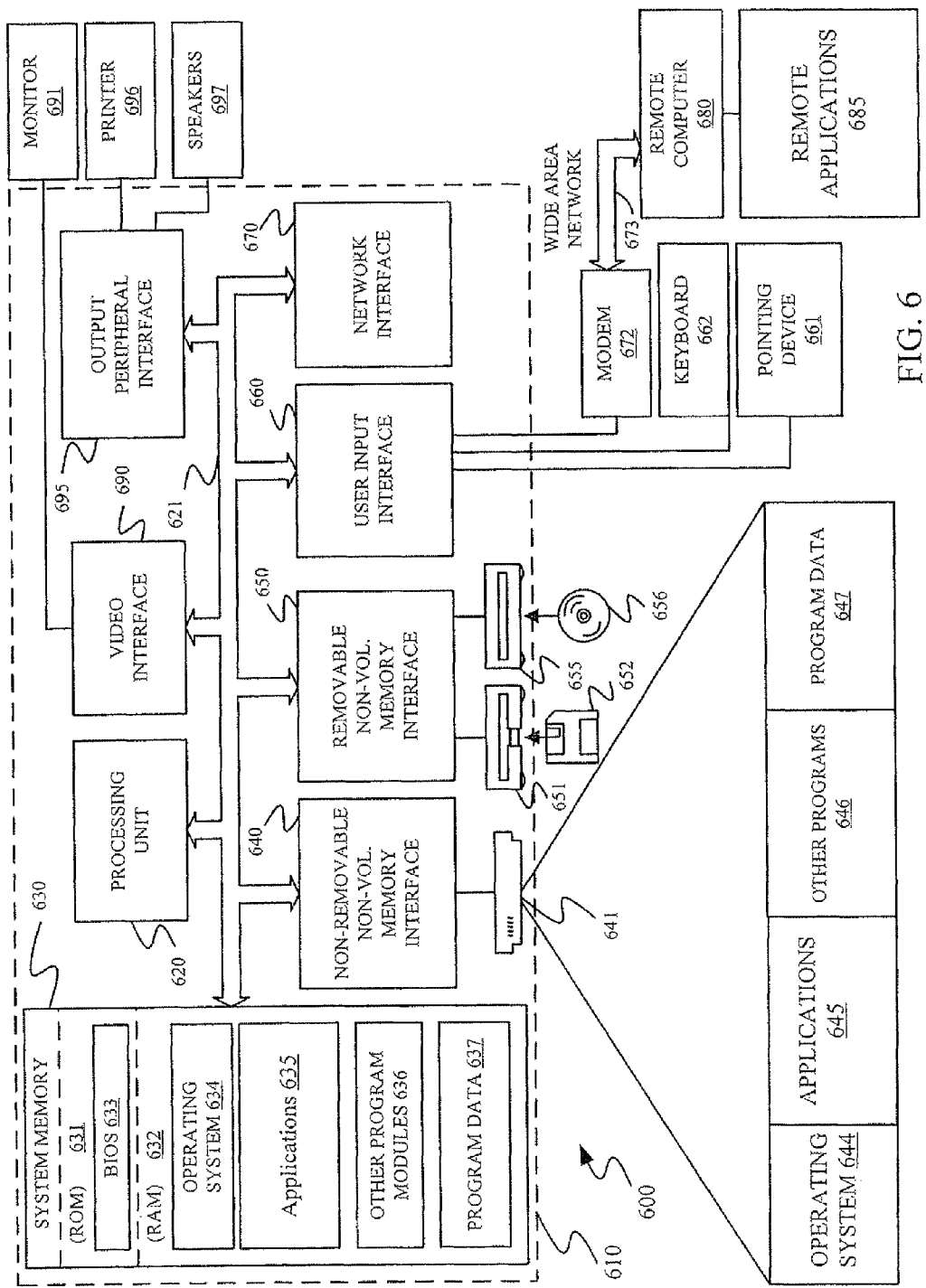
FIG. 6 is a block diagram illustrating one exemplary operating environment in which the system of FIG. 2 can be deployed.

FIG. 6 is one embodiment of a computing environment in which the invention can be used. With reference to FIG. 6, an exemplary system for implementing some embodiments includes a general-purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637. The systems discussed above in FIGS. 2-5 can be stored in other program modules 636 or elsewhere, including being stored remotely. Similarly, computer 610 can be used to implement relational database 150, with one or more of the storage components being used as the relational data store and processing unit 620 being used as the core query processing component.

The computer 610 may also include other removable/non-removable volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user may enter commands and information into the computer 610 through input devices such as a keyboard 662, a microphone 663, and a pointing device 661, such as a mouse, trackball or touch pad. Other input devices (not shown) may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 is operated in a networked environment using logical connections to one or more remote computers, such as a remote computer 680. The remote computer 680 may be a personal computer, a hand-held device, a server, a router, a network PC, a peer device or other common network node, and typically includes many or all of the elements described above relative to the computer 610. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on remote computer 680. It will be appreciated that the network connections shown are exemplary and other means of establishing a communications link between the computers may be used.

As mentioned above, relational database 150 can be implemented using processing unit 620 and any of a variety of the computer storage components discussed in FIG. 1. In addition, the server in relational database 150, and the core query processing component 160 can be implemented by activating processing unit 620, to perform as described above with respect to FIGS. 2-5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of retrieving data from a relational database having a processing component and a relational data store, comprising:
   receiving a semantic query that depends, for its execution, on application of at least one semantic rule;
   expressing the semantic query within the relational database, using the processing component;
   executing the semantic query against the relational data store, using the processing component within the relational database; and
   returning database results, using the processing component, generated from execution of the semantic query, wherein the semantic query further comprises a recursive semantic query requiring application of a recursive semantic rule and wherein expressing the semantic query comprises:
   generating a table valued function using a common table expression to express the recursive semantic rule.

2. The computer-implemented method of claim 1 wherein executing the semantic query comprises calling the table valued function.

3. The computer-implemented method of claim 1 wherein the semantic query comprises a bifurcating recursive semantic query requiring application of a bifurcating recursive semantic rule and wherein expressing comprises:
   generating a table valued function that defines the bifurcating recursive semantic rule.

4. The computer-implemented method of claim 1 wherein expressing the semantic query within the relational database comprises:
   expressing only non-recursive and linearly recursive semantic queries within the relational database.

5. The computer-implemented method of claim 1 wherein expressing the semantic query is performed after receiving the semantic query and in response to receiving the semantic query.

6. The computer-implemented method of claim 1 wherein expressing the semantic query results in a direct expression of the semantic query and is performed prior to receiving the semantic query, and further comprising:
   storing the direct expression of the semantic query for execution against the relational data store in response to receiving the semantic query.

7. The computer-implemented method of claim 1 and further comprising:
   after receiving the semantic query, determining whether the semantic query has an expression stored within the relational database; and
   if not, expressing the semantic query within the relational database.

8. The computer-implemented method of claim 1 wherein expressing the semantic query comprises:
   defining a scalar valued function that expresses a semantic rule to be applied in executing the semantic query, and wherein executing the semantic query comprises calling the scalar valued function.

9. A relational database stored in a memory, comprising:
   a relational data store storing data in a form represented by a graph structure comprising a set of triples, each triple including a subject node, an object node and a predicate connecting the subject and object nodes; and
   a processing component that defines and stores at least one semantic rule to be applied in executing a semantic query, the processing component receiving a call to the at least one semantic rule and directly executing the at least one semantic rule against the graph structure in the relational data store within the relational database to return results responsive to the semantic query, wherein the semantic query further comprises a recursive semantic query requiring application of a recursive semantic rule and wherein the recursive semantic rule is expressed by generating a table valued function using a common table expression.

10. The relational database of claim 9 wherein the semantic query comprises a recursive semantic query requiring application of a recursive semantic rule having at least one unbound subject or object such that when directly executing the recursive semantic rule against the graph structure, the processing component recursively climbs the graph structure to obtain results that bind the at least one unbound subject or object.

11. The relational database of claim 10 wherein the processing component defines a group of four functions to express all bindings for the semantic rule.

12. The relational database of claim 9 wherein the processing component defines and stores the at least one semantic rule prior to receiving a call to the at least one semantic rule.

13. The relational database of claim 9 wherein the processing component defines the at least one semantic rule in response to receiving the at least one semantic query.

14. The relational database of claim 9 wherein the processing component defines and stores all classes of semantic rules, including non-recursive, linearly recursive and bifurcating recursive semantic rules.

15. The relational database of claim 9 wherein the processing component defines and stores only non-recursive and linearly recursive semantic rules.

16. The relational database of claim 15 wherein the processing component determines whether the semantic query is a bifurcating recursive semantic query and, if so, provides the semantic query to a semantic reasoning engine, external to the relational database, for processing.

17. A relational database stored in a memory, comprising:
   a relational data store storing items and indicating relations between the items;
   a hardware computer readable medium storing semantic rules applied to execute semantic queries, the semantic rules falling into one of only a subset of classes of semantic rules, within the relational database; and
   a processing component, receiving an input semantic query, and calling at least one of the stored semantic rules that express the input semantic rules and executing the one of the semantic queries against the relational data store to obtain search results responsive to the input semantic query, the processing component executing a query plan that accounts for semantic dependencies in the input semantic query, wherein the semantic query further comprises a recursive semantic query requiring application of a recursive semantic rule and wherein the processing component expresses the recursive semantic rule by generating the table valued function using a common table expression.

18. The relational database of claim 17 wherein the subset of classes of semantic rules stored in the computer readable medium comprises:
   non-recursive semantic rules; and
   linearly recursive semantic rules.

* * * * *